United States Patent
Hsieh et al.

(10) Patent No.: US 8,570,272 B2
(45) Date of Patent: Oct. 29, 2013

(54) ELECTROPHORESIS DISPLAY PANEL

(75) Inventors: Ming-Che Hsieh, Taipei (TW);
Chih-Wei Chu, Hsinchu County (TW);
Shih-Yu Wang, Changhua County (TW)

(73) Assignee: Au Optronics Corporation, Hsinchu (TW)

( * ) Notice: Subject to any disclaimer, the term of this patent is extended or adjusted under 35 U.S.C. 154(b) by 675 days.

(21) Appl. No.: 12/753,081

(22) Filed: Apr. 1, 2010

(65) Prior Publication Data

US 2011/0102313 A1    May 5, 2011

(30) Foreign Application Priority Data

Oct. 29, 2009 (TW) ............... 98136679 A

(51) Int. Cl.
*G09G 3/38* (2006.01)
*G09G 3/34* (2006.01)
*G02B 26/00* (2006.01)

(52) U.S. Cl.
USPC ........................... 345/107; 345/105; 359/296

(58) Field of Classification Search
USPC .................. 345/105, 107; 359/296
See application file for complete search history.

(56) References Cited

U.S. PATENT DOCUMENTS

| | | | |
|---|---|---|---|
| 6,751,007 B2 * | 6/2004 | Liang et al. ............ | 359/296 |
| 6,888,604 B2 | 5/2005 | Rho et al. | |
| 2002/0050976 A1 * | 5/2002 | Yamaguchi et al. ....... | 345/105 |
| 2006/0284872 A1 * | 12/2006 | Brown Elliott ........... | 345/426 |
| 2007/0013649 A1 | 1/2007 | Kim et al. | |
| 2007/0202618 A1 * | 8/2007 | Ohno et al. ............. | 438/22 |
| 2009/0207328 A1 * | 8/2009 | Hur et al. .............. | 349/37 |

FOREIGN PATENT DOCUMENTS

TW    200741288    11/2007

\* cited by examiner

*Primary Examiner* — Jonathan Horner
*Assistant Examiner* — Sumati Lefkowitz
(74) *Attorney, Agent, or Firm* — Jianq Chyun IP Office

(57) ABSTRACT

An electrophoresis display panel includes a plurality of first sub-pixels, a plurality of second sub-pixels, a plurality of third sub-pixels, and a plurality of white sub-pixels. The first sub-pixels, the second sub-pixels, and the third sub-pixels are suitable for irradiating different light of three primary colors, respectively, while the white sub-pixels are suitable for irradiating white light. Each of the first sub-pixels does not adjoin the second sub-pixels and the third sub-pixels. Each of the second sub-pixels does not adjoin the third sub-pixels. Each of the first sub-pixels adjoins the white sub-pixels exclusively or adjoins the white sub-pixels and other first sub-pixels exclusively.

8 Claims, 8 Drawing Sheets

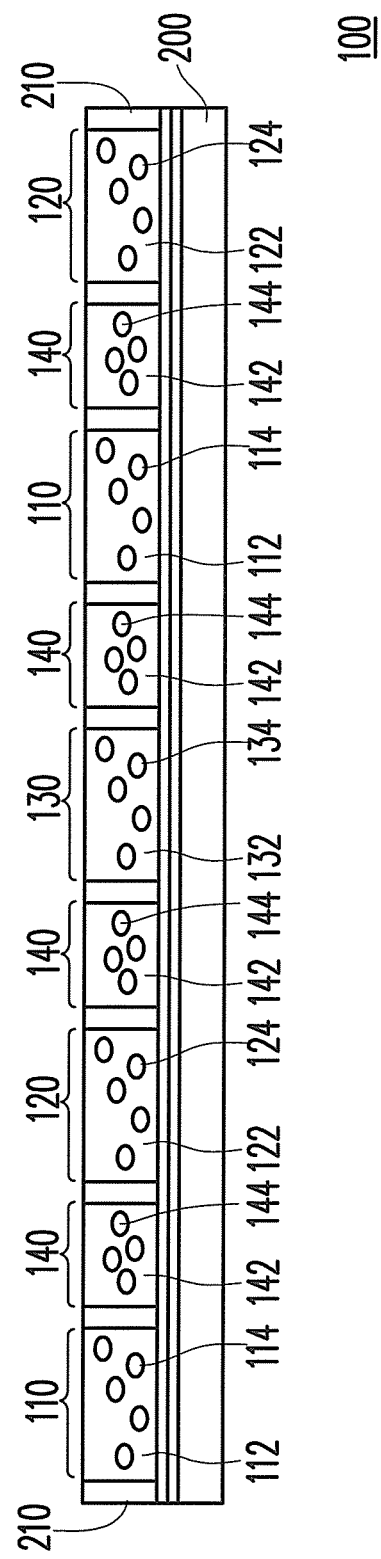

ELECTROPHORESIS DISPLAY PANEL

CROSS-REFERENCE TO RELATED APPLICATION

This application claims the priority benefit of Taiwan application serial no. 98136679, filed on Oct. 29, 2009. The entirety of the above-mentioned patent application is hereby incorporated by reference herein and made a part of specification.

BACKGROUND OF THE INVENTION

1. Field of the Invention

The invention relates to an electrophoresis display panel. More particularly, the invention relates to an electrophoresis display panel with three primary color sub-pixels and white sub-pixels.

2. Description of Related Art

Recently, with ongoing progress and continuous research and development activities in display technologies, commercialized display products including electrophoresis displays, liquid crystal displays, plasma displays, and organic light emitting diode displays have been extensively applied to display apparatuses with various sizes and dimensions. Moreover, since portable electronic products are popularized, the market has gradually called for attention to flexible displays (e.g. e-paper, e-books, and so on). In general, images are displayed on the e-paper and the e-books through the technique of electrophoresis.

For example, a monochrome (black and white) e-book display requires sub-pixels mainly composed of a black electrophoretic fluid and electrically-charged white particles doped in the black electrophoretic fluid. By applying voltages, the electrically-charged white particles are moved, such that each pixel respectively displays black, white, or different gray levels. By contrast, in a color e-book capable of displaying three primary colors, namely red, green, and blue, red electrophoretic fluid, green electrophoretic fluid, and blue electrophoretic fluid respectively mixed with electrically-charged white particles are required to fill different micro-cups. Conventionally, the electrophoretic fluids with different colors can be either formed in the micro-cups by ink jet printing (IJP) process or sealed in the micro-cups by performing photolithography and etching processes.

Based on the above, conducting the IJP process to fill the micro-cups with the electrophoretic fluids having different colors reduces the cost, while applying the IJP process is prone to cause misalignment and inaccurate consumption of the electrophoretic fluids, thus resulting in color mixing problems or discoloration of the electrophoretic fluids. On the other hand, even though the color mixing problems of the electrophoretic fluids can be mitigated by performing photolithography and etching processes, material waste during the photolithography and etching processes gives rise to the cost.

SUMMARY OF THE INVENTION

The invention is directed to an electrophoresis display panel and a manufacturing method thereof to resolve color mixing problems of electrophoretic fluids.

In the invention, an electrophoresis display panel including a plurality of first sub-pixels, a plurality of second sub-pixels, a plurality of third sub-pixels, and a plurality of white sub-pixels is provided. The first sub-pixels, the second sub-pixels, and the third sub-pixels are suitable for irradiating different light of three primary colors, respectively, while the white sub-pixels are suitable for irradiating white light. Each of the first sub-pixels does not adjoin the second sub-pixels and the third sub-pixels. Each of the second sub-pixels does not adjoin the third sub-pixels. Each of the first sub-pixels adjoins the white sub-pixels exclusively or adjoins the white sub-pixels and other first sub-pixels exclusively.

According to an exemplary embodiment of the invention, the first sub-pixels are red sub-pixels, the second sub-pixels are green sub-pixels, and the third sub-pixels are blue sub-pixels.

According to an exemplary embodiment of the invention, each of the red sub-pixels includes a red electrophoretic fluid and electrically-charged white particles doped in the red electrophoretic fluid, each of the green sub-pixels includes a green electrophoretic fluid and electrically-charged white particles doped in the green electrophoretic fluid, each of the blue sub-pixels includes a blue electrophoretic fluid and electrically-charged white particles doped in the blue electrophoretic fluid, and each of the white sub-pixels includes a black electrophoretic fluid and electrically-charged white particles doped in the black electrophoretic fluid.

According to an exemplary embodiment of the invention, each of the first sub-pixels adjoins the white sub-pixels exclusively, and each of the first sub-pixels, each of the second sub-pixels, each of the third sub-pixels, and each of the white sub-pixels are triangular sub-pixels.

According to an exemplary embodiment of the invention, three of the white sub-pixels, one of the first sub-pixels, one of the second sub-pixels, and one of the third sub-pixels together form a hexagonal sub-pixel group.

According to an exemplary embodiment of the invention, one of the white sub-pixels, one of the first sub-pixels adjoining the one of the white sub-pixels, one of the second sub-pixels adjoining the one of the white sub-pixels, and one of the third sub-pixels adjoining the one of the white sub-pixels together form a triangular pixel.

According to an exemplary embodiment of the invention, each of the first sub-pixels adjoins three of the white sub-pixels.

According to an exemplary embodiment of the invention, each of the first sub-pixels adjoins the white sub-pixels exclusively. Each of the first sub-pixels, each of the second sub-pixels, each of the third sub-pixels, and each of the white sub-pixels are rectangular sub-pixels. Besides, each of the first sub-pixels adjoins four of the white sub-pixels.

According to an exemplary embodiment of the invention, the first sub-pixels and parts of the white sub-pixels are arranged in columns, the second sub-pixels and parts of the white sub-pixels are arranged in columns, and the third sub-pixels and parts of the white sub-pixels are arranged in columns.

According to an exemplary embodiment of the invention, the first sub-pixels and parts of the white sub-pixels are arranged in rows, the second sub-pixels and parts of the white sub-pixels are arranged in rows, and the third sub-pixels and parts of the white sub-pixels are arranged in rows.

According to an exemplary embodiment of the invention, each of the first sub-pixels adjoins the white sub-pixels and other first sub-pixels exclusively, and each of the first sub-pixels adjoins two of the white sub-pixels and other two of the first sub-pixels.

According to an exemplary embodiment of the invention, the first sub-pixels are arranged in columns, the second sub-pixels are arranged in columns, the third sub-pixels are arranged in columns, and the white sub-pixels are arranged in columns.

According to an exemplary embodiment of the invention, the first sub-pixels are arranged in rows, the second sub-pixels are arranged in rows, the third sub-pixels are arranged in rows, and the white sub-pixels are arranged in rows.

In the invention, a manufacturing method of an electrophoresis display panel is further provided. In the manufacturing method, first, a pixel defining layer is formed on a substrate, and the pixel defining layer includes a plurality of micro-cups. Next, a plurality of first sub-pixels, a plurality of second sub-pixels, and a plurality of third sub-pixels are formed in different parts of the micro-cups. Here, the first sub-pixels, the second sub-pixels, and the third sub-pixels are suitable for irradiating different light of three primary colors, respectively. Each of the first sub-pixels does not adjoin the second sub-pixels and the third sub-pixels, and each of the second sub-pixels does not adjoin the third sub-pixels. After the first sub-pixels, the second sub-pixels, and the third sub-pixels are formed, a plurality of white sub-pixels are formed in the other parts of the micro-cups. Here, each of the first sub-pixels adjoins the white sub-pixels exclusively or adjoins the white sub-pixels and other first sub-pixels exclusively.

According to an exemplary embodiment of the invention, a method of forming the first sub-pixels, the second sub-pixels, and the third sub-pixels includes following steps. First, the parts of the micro-cups are filled with a red electrophoretic fluid and electrically-charged white particles doped in the red electrophoretic fluid, a green electrophoretic fluid and electrically-charged white particles doped in the green electrophoretic fluid, and a blue electrophoretic fluid and electrically-charged white particles doped in the blue electrophoretic fluid, respectively. After that, the red, the green, and the blue electrophoretic fluids are irradiated by ultraviolet light to form a first curing layer, and the first curing layer seals the red, the green, and the blue electrophoretic fluids into the parts of the micro-cups.

According to an exemplary embodiment of the invention, a method of forming the white sub-pixels includes following steps. First, the other parts of the micro-cups are filled with a black electrophoretic fluid and electrically-charged white particles doped in the black electrophoretic fluid. Next, the black electrophoretic fluid is irradiated by ultraviolet light to form a second curing layer, and the second curing layer seals the black electrophoretic fluid into the other parts of the micro-cups.

According to an exemplary embodiment of the invention, the first sub-pixels, the second sub-pixels, and the third sub-pixels are formed simultaneously.

Since each of the first sub-pixels adjoins the white sub-pixels exclusively or adjoins the white sub-pixels and other first sub-pixels exclusively in the invention, the color mixing problems of the electrophoretic fluids are not apt to arise in the electrophoresis display panel of the invention.

It is to be understood that both the foregoing general descriptions and the following detailed descriptions are exemplary and are, together with the accompanying drawings, intended to provide further explanation of technical features and advantages of the invention.

BRIEF DESCRIPTION OF DRAWINGS

The accompanying drawings are included to provide a further understanding of the invention and are incorporated in and constitute a part of this specification. The drawings illustrate embodiments of the invention and, together with the descriptions, serve to explain the principles of the invention. In the drawings, FIGS. 1A and 1A' are schematic top views illustrating an electrophoresis display panel according to a first embodiment of the invention.

DESCRIPTION OF EMBODIMENTS

First Embodiment

Figure 1A:
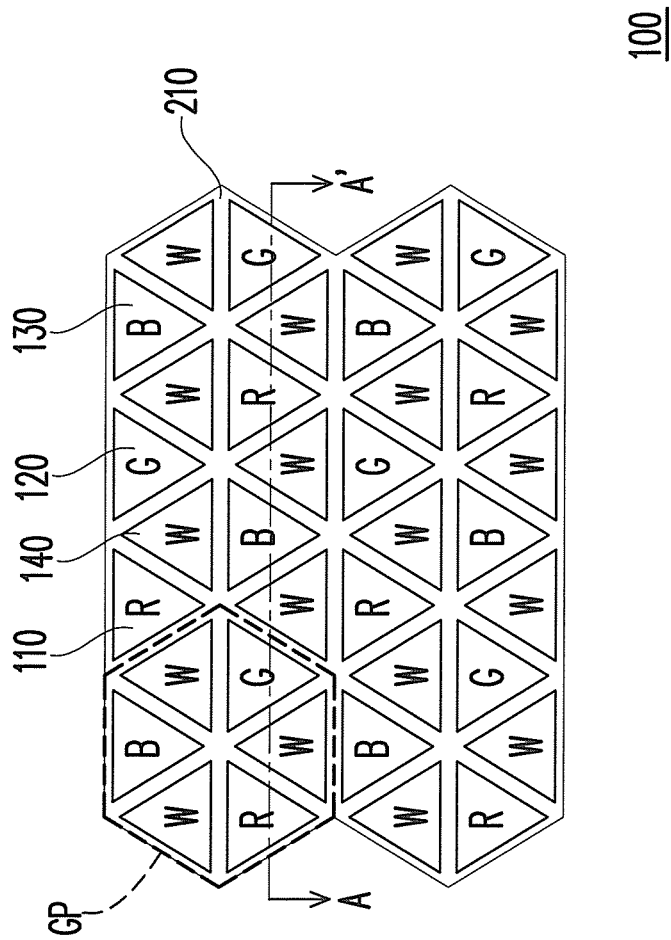
FIG. 1B is a schematic cross-sectional view taken along a section line A-A' depicted in FIG. 1A.
Figure 1A:
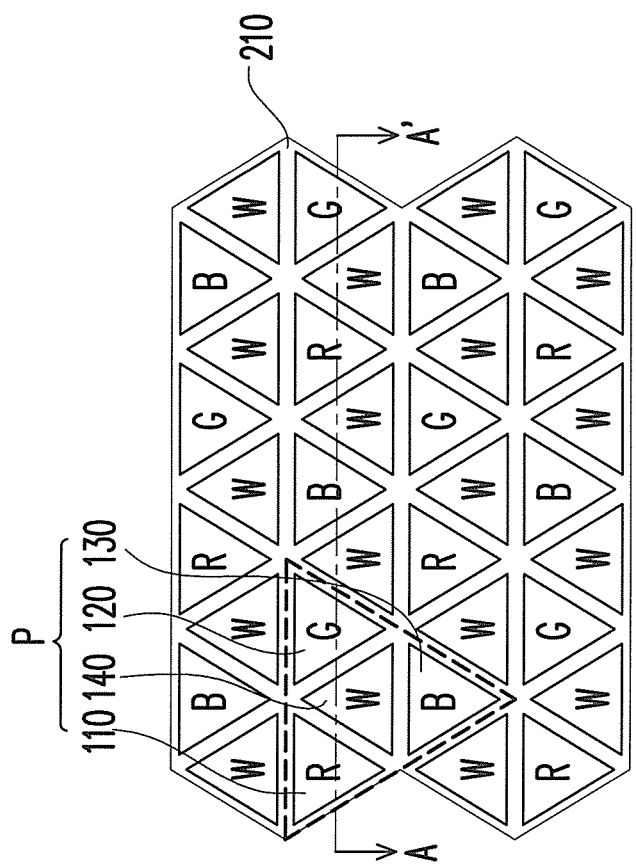

FIGS. 1A and 1A' are schematic top views illustrating an electrophoresis display panel according to a first embodiment of the invention. FIG. 1B is a schematic cross-sectional view taken along a section line A-A' depicted in FIG. 1A. As shown in FIGS. 1A, 1A', and 1B, in this embodiment, an electrophoresis display panel 100 includes a plurality of first sub-pixels 110, a plurality of second sub-pixels 120, a plurality of third sub-pixels 130, and a plurality of white sub-pixels 140. The first sub-pixels 110, the second sub-pixels 120, and the third sub-pixels 130 are suitable for irradiating different light of three primary colors R, G, and B, respectively, while the white sub-pixels 140 are suitable for irradiating white light W. Each of the first sub-pixels 110 does not adjoin the second sub-pixels 120 and the third sub-pixels 130. Each of the second sub-pixels 120 does not adjoin the third sub-pixels 130. Each of the first sub-pixels 110 adjoins the white sub-pixels 140 exclusively.

Note that the first sub-pixels 110, the second sub-pixels 120, and the third sub-pixels 130 are surrounded by the white sub-pixels 140 respectively. That is to say, the first sub-pixels 110, the second sub-pixels 120, and the third sub-pixels 130 are separated by the white sub-pixels 140.

According to the embodiment, the first sub-pixels 110 are red sub-pixels, the second sub-pixels 120 are green sub-pixels, and the third sub-pixels 130 are blue sub-pixels. To be more specific, each of the red sub-pixels (i.e. the first sub-pixels 110) includes a red electrophoretic fluid 112 and electrically-charged white particles 114 doped in the red electrophoretic fluid 112. Each of the green sub-pixels (i.e. the second sub-pixels 120) includes a green electrophoretic fluid 122 and electrically-charged white particles 124 doped in the green electrophoretic fluid 122. Each of the blue sub-pixels (i.e. the third sub-pixels 130) includes a blue electrophoretic fluid 132 and electrically-charged white particles 134 doped in the blue electrophoretic fluid 132. Each of the white sub-pixels 140 includes a black electrophoretic fluid 142 and electrically-charged white particles 144 doped in the black electrophoretic fluid 142.

It is known from FIGS. 1A and 1A' that each of the first sub-pixels 110 adjoins the white sub-pixels 140 exclusively. In addition, the first sub-pixels 110, the second sub-pixels 120, the third sub-pixels 130, and the white sub-pixels 140 are triangular sub-pixels. For instance, the aforesaid triangular sub-pixels are equilateral triangular sub-pixels. When the first sub-pixels 110, the second sub-pixels 120, the third sub-pixels 130, and the white sub-pixels 140 are all the triangular sub-pixels, each of the first sub-pixels 110 adjoins three of the white sub-pixels 140, each of the second sub-pixels 120 adjoins three of the white sub-pixels 140, and each of the third sub-pixels 130 adjoins three of the white sub-pixels 140 as well.

As indicated in FIG. 1A, when the first sub-pixels 110, the second sub-pixels 120, the third sub-pixels 130, and the white sub-pixels 140 are all the triangular sub-pixels, the adjoining one of the first sub-pixels 110, one of the second sub-pixels 120, one of the third sub-pixels 130, and three of the white sub-pixels 140 together form a hexagonal sub-pixel group GP.

Besides, as indicated in FIG. 1A', when the first sub-pixels 110, the second sub-pixels 120, the third sub-pixels 130, and the white sub-pixels 140 are all the triangular sub-pixels, the adjoining one of the first sub-pixels 110, one of the second sub-pixels 120, one of the third sub-pixels 130, and one of the white sub-pixels 140 together form a triangular pixel P. Here, the triangular pixel P is an equilateral triangular pixel, for instance.

Detailed descriptions with respect to a manufacturing method of the electrophoresis display panel are provided hereinafter along with FIGS. 2A to 2C.

Figure 2A:
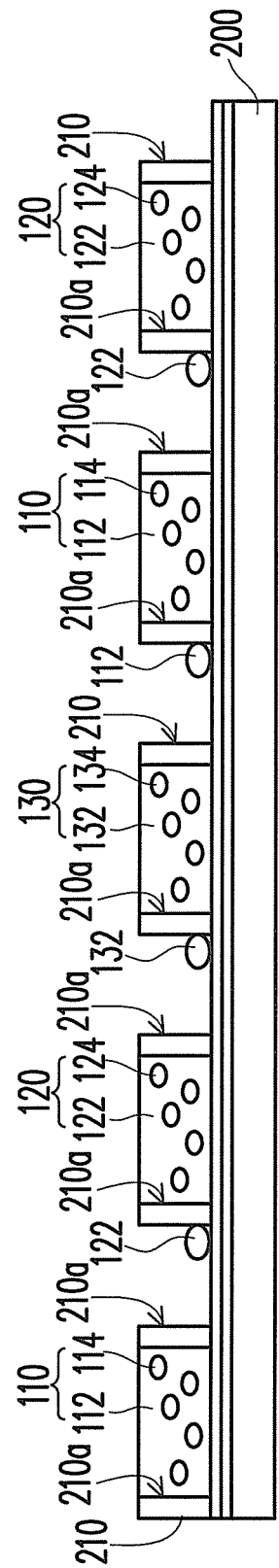
FIGS. 2A to 2C are schematic views illustrating a manufacturing method of an electrophoresis display panel according to an embodiment of the invention.
Figure 2B:
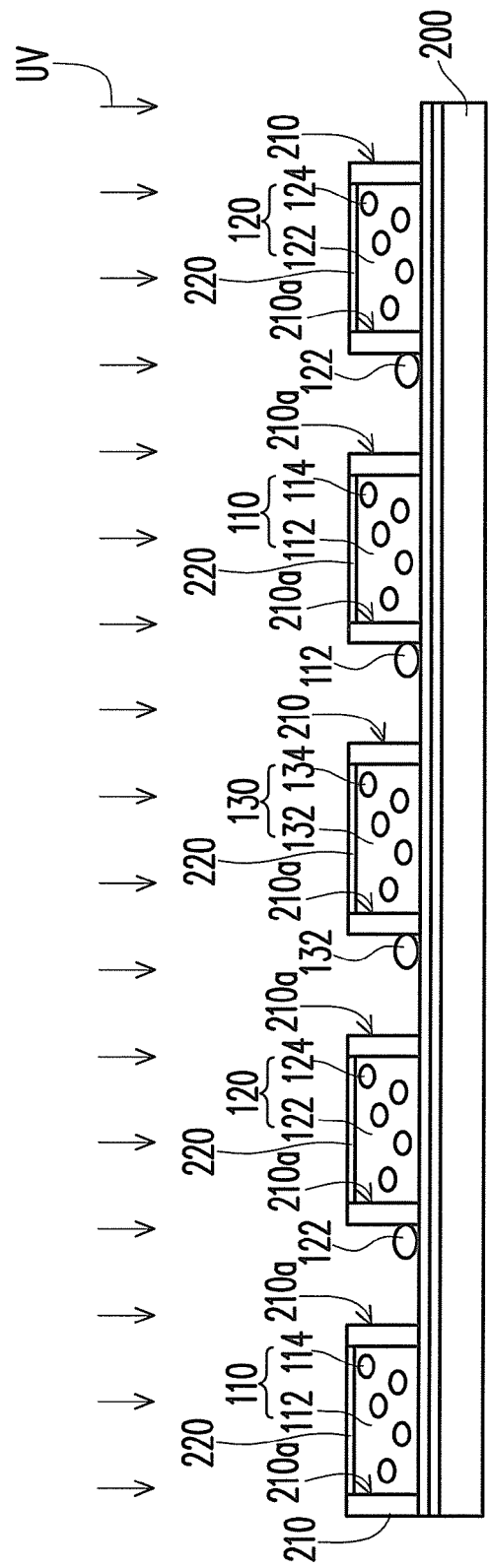
Figure 2C:
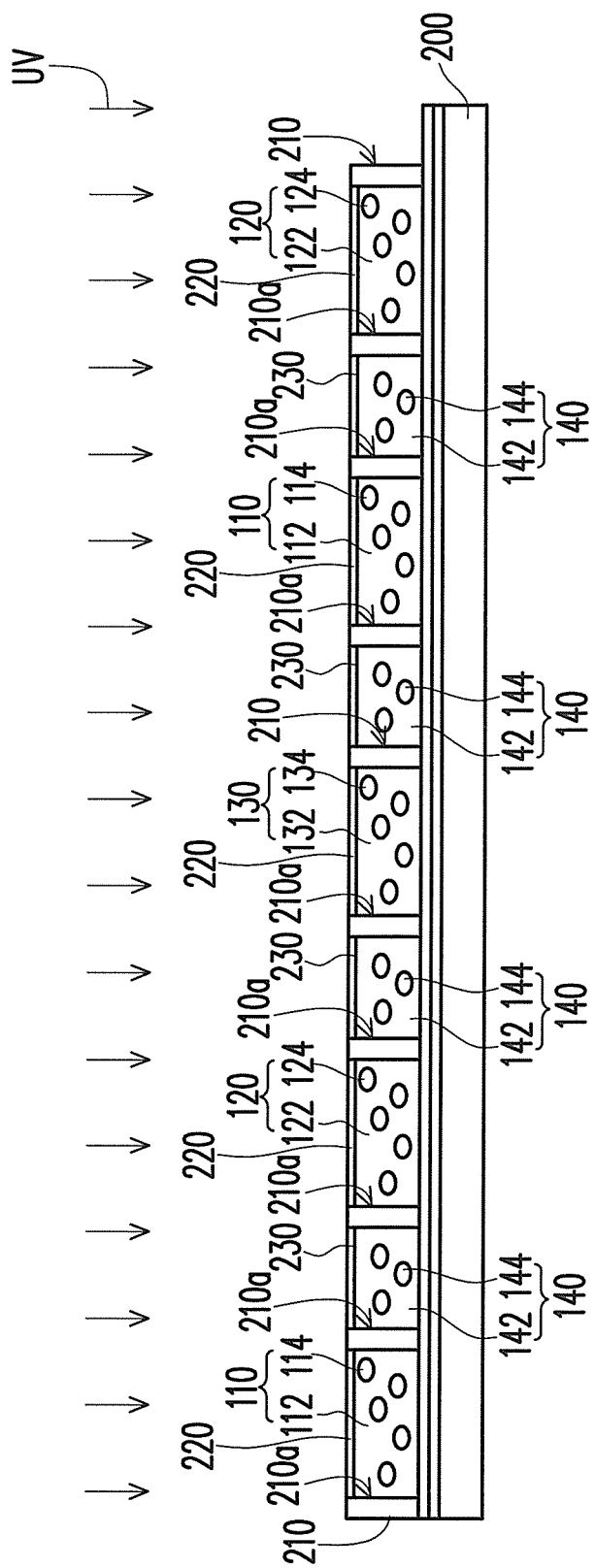

FIGS. 2A to 2C are schematic views illustrating a manufacturing method of an electrophoresis display panel according to an embodiment of the invention. With reference to FIG. 2A, in the manufacturing method, a pixel defining layer 210 is first formed on a substrate 200, and the pixel defining layer 210 includes a plurality of micro-cups 210a. Next, the first sub-pixels 110, the second sub-pixels 120, and the third sub-pixel 130 are formed in parts of the micro-cups 210a. Note that the first sub-pixels 110, the second sub-pixels 120, and the third sub-pixel 130 are formed by ink-jet printing (IJP), for example. Relative positions of the first sub-pixels 110, the second sub-pixels 120, and the third sub-pixels 130 are shown in FIG. 1A.

In this embodiment, a method of forming the first sub-pixels 110, the second sub-pixels 120, and the third sub-pixels 130 exemplarily includes first filling a part of the micro-cups 210a with the red electrophoretic fluid 112 and the electrically-charged white particles 114 doped in the red electrophoretic fluid 112. Next, another part of the micro-cups 210a is filled with the green electrophoretic fluid 122 and the electrically-charged white particles 124 doped in the green electrophoretic fluid 122. Thereafter, still another part of the micro-cups 210a is filled with the blue electrophoretic fluid 132 and the electrically-charged white particles 134 doped in the blue electrophoretic fluid 132. Each of the first sub-pixels 110 does not adjoin the second sub-pixels 120 and the third sub-pixels 130, and each of the second sub-pixels 120 does not adjoin the third sub-pixels 130. Hence, even though IJP causes misalignment or inaccurate consumption of the red, the green, and the blue electrophoretic fluids 112, 122, and 132, discoloration or the color mixing problems of the red, the green, and the blue electrophoretic fluids 112, 122, and 132 are rather unlikely to arise. In addition, the overflow red, green, and blue electrophoretic fluids 112, 122, and 132 merely flow into the micro-cups 210a to be filled with the black electrophoretic fluid 142.

It should be mentioned that the order of forming the first sub-pixels 110, the second sub-pixels 120, and the third sub-pixels 130 is not limited in the invention. Based on the required order of forming the first, the second, and the third sub-pixels 110, 120, and 130, one ordinary skill in the art is capable of correspondingly filling the micro-cups 210a with the electrophoretic fluids having different colors. In an alternative embodiment, the first sub-pixels 110, the second sub-pixels 120, and the third sub-pixels 130 may be formed simultaneously.

Next, with reference to FIG. 2B, the corresponding micro-cups 210a are filled with the red, the green, and the blue electrophoretic fluids 112, 122, and 132, respectively, and the red, the green, and the blue electrophoretic fluids 112, 122, and 132 are irradiated by ultraviolet light UV, such that a first curing layer 220 is formed on upper surfaces of the red, the green, and the blue electrophoretic fluids 112, 122, and 132. It is known from FIG. 2B that the first curing layer 220 seals the red, the green, and the blue electrophoretic fluids 112, 122, and 132 into the parts of the micro-cups 210a. Particularly, the red, the green, and the blue electrophoretic fluids 112, 122, and 132 contain light-weight ultraviolet curable materials. Thus, when the red, the green, and the blue electrophoretic fluids 112, 122, and 132 are irradiated by the ultraviolet light UV, the ultraviolet curable materials suspending on the upper surfaces of the red, the green, and the blue electrophoretic fluids 112, 122, and 132 are cured to form a refined first curing layer 220.

After that, with reference to FIG. 2C, the white sub-pixels 140 are formed in the other part of the micro-cups 210a after the first sub-pixels 110, the second sub-pixels 120, and the third sub-pixels 130 are formed. According to this embodiment, a method of forming the white sub-pixels 140 exemplarily includes first filling the other part of the micro-cups 210a with the black electrophoretic fluid 142 and the electrically-charged white particles 144 doped in the black electrophoretic fluid 142. Next, the black electrophoretic fluid 142 is irradiated by ultraviolet light UV to form a second curing layer 230. It is known from FIG. 2C that the second curing layer 230 seals the black electrophoretic fluid 142 into the other part of the micro-cups 210a. Specifically, the black electrophoretic fluid 142 contains light-weight ultraviolet curable materials. Thus, when the black electrophoretic fluid 142 is irradiated by the ultraviolet light UV, the ultraviolet curable materials suspending on the upper surface of the black electrophoretic fluid 142 are cured to form a refined second curing layer 230.

The overflow red, green, or blue electrophoretic fluid 112, 122, or 132 is blended into the black electrophoretic fluid 142 but does not have significant impact on display quality of the white sub-pixels 140.

Second Embodiment

Figures 3A, 3B:
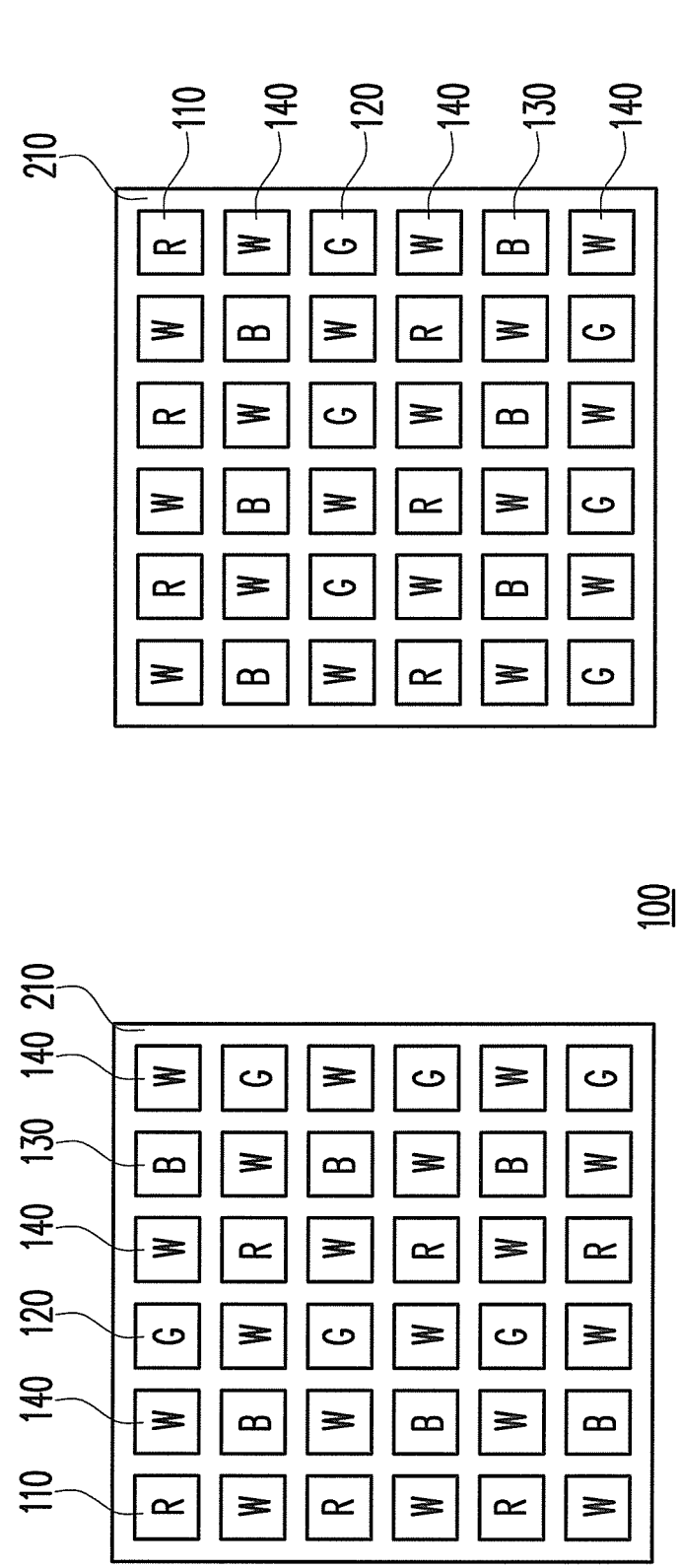
FIGS. 3A and 3B are schematic top views illustrating an electrophoresis display panel according to a second embodiment of the invention.

FIGS. 3A and 3B are schematic top views illustrating an electrophoresis display panel according to a second embodiment of the invention. As indicated in FIGS. 3A and 3B, in this embodiment, each of the first sub-pixels 110 adjoins the white sub-pixels 140 exclusively. Each of the first sub-pixels 110, each of the second sub-pixels 120, each of the third sub-pixels 130, and each of the white sub-pixels 140 are rectangular sub-pixels. Besides, each of the first sub-pixels 110 adjoins four of the white sub-pixels 140. It is known from FIGS. 3A and 3B that the first sub-pixels 110, the second sub-pixels 120, the third sub-pixels 130, and the white sub-pixels 140 are square sub-pixels, for instance.

As shown in FIG. 3A, the first sub-pixels 110 and parts of the white sub-pixels 140 are arranged in columns, the second sub-pixels 120 and parts of the white sub-pixels 140 are arranged in columns, and the third sub-pixels 130 and parts of the white sub-pixels 140 are arranged in columns.

Additionally, as shown in FIG. 3B, the first sub-pixels 110 and parts of the white sub-pixels 140 are arranged in rows, the second sub-pixels 120 and parts of the white sub-pixels 140 are arranged in rows, and the third sub-pixels 130 and parts of the white sub-pixels 140 are arranged in rows.

Third Embodiment

Figure 4B:
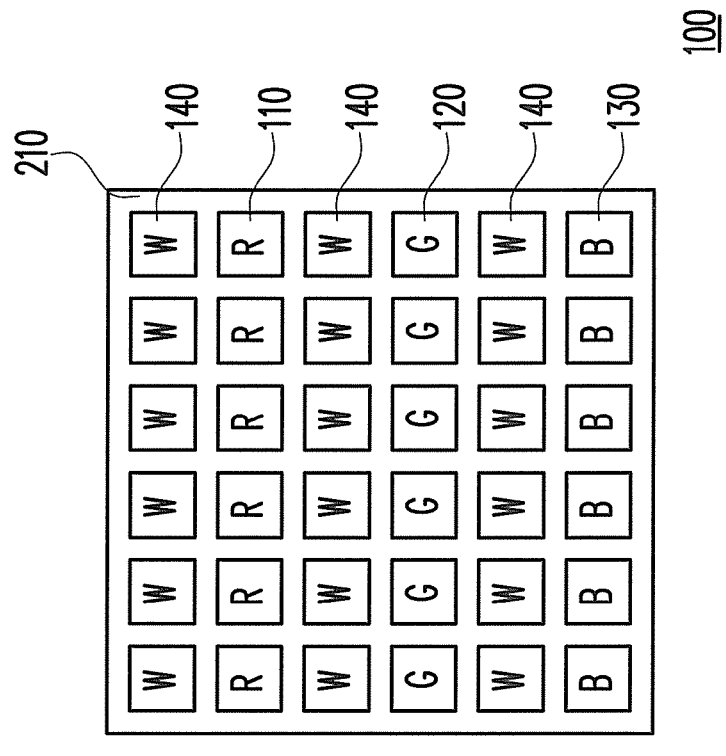
FIGS. 4A and 4B are schematic top views illustrating an electrophoresis display panel according to a third embodiment of the invention.
Figure 4A:
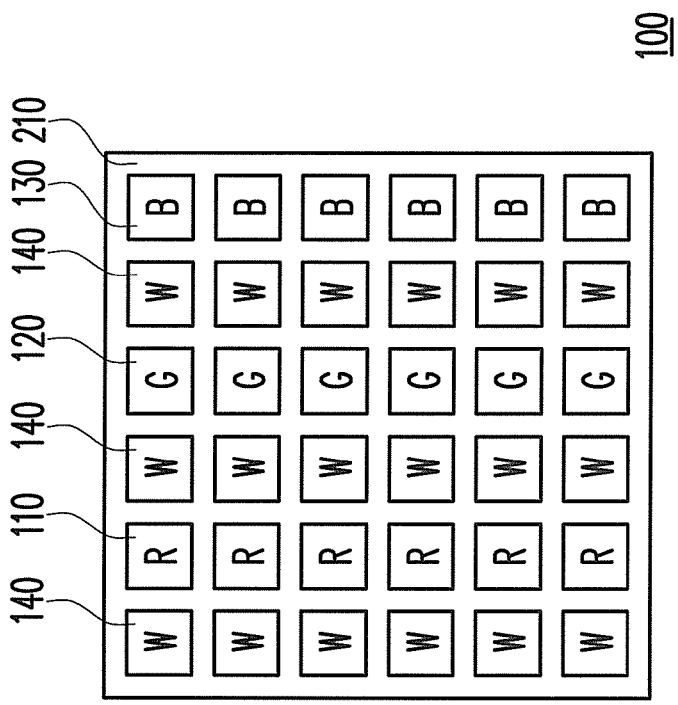

FIGS. 4A and 4B are schematic top views illustrating an electrophoresis display panel according to a third embodiment of the invention. With reference to FIGS. 4A and 4B, in this embodiment, each of the first sub-pixels 110 adjoins the white sub-pixels 140 and other first sub-pixels 110 exclusively, and each of the first sub-pixels 110 adjoins two of the white sub-pixels 140 and other two of the first sub-pixels 110.

As shown in FIG. 4A, the first sub-pixels 110 are arranged in columns, the second sub-pixels 120 are arranged in columns, the third sub-pixels 130 are arranged in columns, and the white sub-pixels 140 are arranged in columns.

Besides, as shown in FIG. 4B, the first sub-pixels 110 are arranged in rows, the second sub-pixels 120 are arranged in rows, the third sub-pixels 130 are arranged in rows, and the white sub-pixels 140 are arranged in rows.

Note that the aforesaid arrangement of the sub-pixels is applicable to a flexible electrophoresis display panel and a non-flexible (rigid) electrophoresis display panel, which is not limited in the invention.

Since each of the first sub-pixels adjoins the white sub-pixels exclusively or adjoins the white sub-pixels and other first sub-pixels exclusively in the invention, discoloration or the color mixing problems of the electrophoretic fluids are not prone to arise in the electrophoresis display panel of the invention, thus accomplishing favorable display quality.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents.

What is claimed is:

1. An electrophoresis display panel comprising:
    a plurality of first sub-pixels, wherein each of the first sub-pixels has a first electrophoretic fluid and electrically-charged white particles doped in the first electrophoretic fluid;
    a plurality of second sub-pixels, wherein each of the second sub-pixels has a second electrophoretic fluid and electrically-charged white particles doped in the second electrophoretic fluid;
    a plurality of third sub-pixels, wherein each of the third sub-pixels has a third electrophoretic fluid and electrically-charged white particles doped in the third electrophoretic fluid, where the first sub-pixels, the second sub-pixels, and the third sub-pixels are suitable for irradiating different light of three primary colors, respectively; and
    a plurality of white sub-pixels suitable for irradiating white light, wherein each of the white sub-pixels has a fourth electrophoretic fluid and electrically-charged white particles doped in the fourth electrophoretic fluid, and each of the first sub-pixels does not adjoin the second sub-pixels and the third sub-pixels, each of the second sub-pixels does not adjoin the third sub-pixels, and each of the first sub-pixels adjoins the white sub-pixels and other first sub-pixels exclusively, and each of the first sub-pixels adjoins two of the white sub-pixels and other two of the first sub-pixels.

2. The electrophoresis display panel as claimed in claim 1, wherein the first sub-pixels are red sub-pixels, the second sub-pixels are green sub-pixels and the third sub-pixels are blue sub-pixels, and the first electrophoretic fluid is a red electrophoretic fluid, the second electrophoretic fluid is a green electrophoretic fluid, the third electrophoretic fluid is a blue electrophoretic fluid and the fourth electrophoretic fluid is a black electrophoretic fluid.

3. The electrophoresis display panel as claimed in claim 1, wherein the first sub-pixels are arranged in columns, the second sub-pixels are arranged in columns, the third sub-pixels are arranged in columns, and the white sub-pixels are arranged in columns.

4. The electrophoresis display panel as claimed in claim 1, wherein the first sub-pixels are arranged in rows, the second sub-pixels are arranged in rows, the third sub-pixels are arranged in rows, and the white sub-pixels are arranged in rows.

5. A manufacturing method of an electrophoresis display panel, comprising:
    forming a pixel defining layer on a substrate, wherein the pixel defining layer comprises a plurality of micro-cups;
    forming a plurality of first sub-pixels, a plurality of second sub-pixels, and a plurality of third sub-pixels in different parts of the micro-cups, wherein the first sub-pixels, the second sub-pixels, and the third sub-pixels are suitable for irradiating different light of three primary colors, respectively, each of the first sub-pixels does not adjoin the second sub-pixels and the third sub-pixels, and each of the second sub-pixels does not adjoin the third sub-pixels; and
    forming a plurality of white sub-pixels in the other part of the micro-cups after the first sub-pixels, the second sub-pixels, and the third sub-pixels are formed, wherein each of the first sub-pixels adjoins the white sub-pixels exclusively or adjoins the white sub-pixels and other first sub-pixels exclusively.

6. The manufacturing method as claimed in claim 5, wherein a method of forming the first sub-pixels, the second sub-pixels, and the third sub-pixels comprises:
    filling a part of the micro-cups with a red electrophoretic fluid and electrically-charged white particles doped in the red electrophoretic fluid;
    filling another part of the micro-cups with a green electrophoretic fluid and electrically-charged white particles doped in the green electrophoretic fluid;
    filling still another part of the micro-cups with a blue electrophoretic fluid and electrically-charged white particles doped in the blue electrophoretic fluid; and
    irradiating the red, the green, and the blue electrophoretic fluids by ultraviolet light to form a first curing layer, wherein the first curing layer seals the red, the green, and the blue electrophoretic fluids into the part, the another part, and the still another part of the micro-cups, respectively.

7. The manufacturing method as claimed in claim 5, wherein a method of forming the white sub-pixels comprises:
    filling the other part of the micro-cups with a black electrophoretic fluid and electrically-charged white particles doped in the black electrophoretic fluid; and
    irradiating the black electrophoretic fluid by ultraviolet light to form a second curing layer, wherein the second curing layer seals the black electrophoretic fluid into the other part of the micro-cups.

8. The manufacturing method as claimed in claim 5, wherein the first sub-pixels, the second sub-pixels, and the third sub-pixels are formed simultaneously.

* * * * *